United States Patent
Perkowitz et al.

(10) Patent No.: US 8,095,613 B1
(45) Date of Patent: Jan. 10, 2012

(54) ELECTRONIC MESSAGE PRIORITIZATION

(75) Inventors: Michael Perkowitz, Seattle, WA (US); Kevin Francis Eustice, Seattle, WA (US); Meliha Yetisgen-Yildiz, Kenmore, WA (US); Kenji Kawai, Seattle, WA (US)

(73) Assignee: Kiha Software Inc., Seattle, WA (US)

( * ) Notice: Subject to any disclaimer, the term of this patent is extended or adjusted under 35 U.S.C. 154(b) by 20 days.

(21) Appl. No.: 12/652,905

(22) Filed: Jan. 6, 2010

Related U.S. Application Data

(60) Provisional application No. 61/142,875, filed on Jan. 6, 2009.

(51) Int. Cl.
G06F 15/16 (2006.01)

(52) U.S. Cl. ........................................ 709/207; 709/206

(58) Field of Classification Search .......... 709/206–207, 709/223–224
See application file for complete search history.

(56) References Cited

U.S. PATENT DOCUMENTS

| | | | |
|---|---|---|---|
| 5,345,551 A | 9/1994 | Shelley et al. | |
| 6,366,922 B1 | 4/2002 | Althoff | |
| 6,370,554 B1 | 4/2002 | Sun-Woo | |
| 6,816,863 B2* | 11/2004 | Bates et al. | 1/1 |
| 6,985,926 B1* | 1/2006 | Ferlauto et al. | 709/206 |
| 7,428,579 B2* | 9/2008 | Libbey et al. | 709/206 |
| 7,565,403 B2* | 7/2009 | Horvitz et al. | 709/206 |
| 7,634,528 B2* | 12/2009 | Horvitz et al. | 709/200 |
| 7,885,948 B2* | 2/2011 | Johnson et al. | 707/705 |
| 7,890,596 B2* | 2/2011 | Guy | 709/207 |
| 2003/0193481 A1 | 10/2003 | Sokolsky | |
| 2005/0057584 A1 | 3/2005 | Gruen et al. | |
| 2005/0261011 A1 | 11/2005 | Scott | |
| 2005/0267944 A1* | 12/2005 | Little, II | 709/207 |
| 2006/0195533 A1* | 8/2006 | Isozaki et al. | 709/206 |
| 2006/0294134 A1 | 12/2006 | Berkhim et al. | |
| 2007/0011236 A1 | 1/2007 | Ravula | |
| 2008/0005249 A1* | 1/2008 | Hart | 709/206 |
| 2008/0059576 A1 | 3/2008 | Liu et al. | |
| 2008/0109751 A1 | 5/2008 | Fitzmaurice et al. | |
| 2009/0006994 A1 | 1/2009 | Forstall et al. | |

OTHER PUBLICATIONS

Information Technology Services, College of Architecture, Texas A&M University, "How to Schedule Rooms in Microsoft Entourage," 2009 [Online] [Retrieved Jul. 29, 2010] Retrieved from the Internet ,<URL: http://its.arch.tamu.edu/content/support/documentation/mail/entourage/entourage-room-scheduling>.

Microsoft Corporation, "Work with Time Zones in Outlook," 2010 [Online] [Retrieved on Jul. 29, 2010] Retrieved from the Internet , <URL:http://office.microsoft.com/en-us/outlook-help/work-with-time-zones-in-outlook-HA001056530.aspx.>.

(Continued)

*Primary Examiner* — Hussein A. Elchanti
(74) *Attorney, Agent, or Firm* — Fenwick & West LLP

(57) ABSTRACT

A system, method, and computer program product dynamically prioritizes electronic messages. An electronic message having one or more properties is received. These message properties can include, a particular sender or body text. Information describing past activity of a recipient user of the electronic message is accessed. A priority is determined for the electronic message, where the determining is based at least in part on a comparison of a property of the electronic message with the accessed information. The priority determination may include detecting the presence of a request in the electronic message, determining the social weight of the sender of the electronic message, determining the temporal urgency of the electronic message, or determining the relevance of the electronic message, for example. An indication of the priority of the message is presented to the recipient user.

20 Claims, 6 Drawing Sheets

OTHER PUBLICATIONS

PCT International Search Report and Written Opinion, PCT Application No. PCT/US2010/020134, May 19, 2010, 7 pages.
PCT International Search Report and Written Opinion, PCT Application No. PCT/US2009/052313, Sep. 3, 2009, 7 pages.
PCT International Search Report and Written Opinion, PCT Application No. PCT/US2009/052311, Sep. 15, 2009, 6 pages.

* cited by examiner

ELECTRONIC MESSAGE PRIORITIZATION

CROSS-REFERENCE TO RELATED APPLICATIONS

This application claims the benefit of U.S. Provisional Patent Application No. 61/142,875, filed Jan. 6, 2009, which is hereby incorporated by reference in its entirety. This application is related to U.S. patent application Ser. No. 12/512,752, filed Jul. 30, 2009, entitled "Social Network Model for Semantic Processing," which is incorporated by reference in its entirety.

BACKGROUND

1. Field of the Invention

The present invention relates to prioritization of electronic messages.

2. Description of the Related Art

A user of a computing device often receives large numbers of electronic messages such as emails, documents, short message service (SMS) messages, and voicemails. The user may not have the time to fully read or listen to each received message, and may need to skim or ignore many received messages. The user may want to focus attention on messages that are important or interesting to the user. Also, the user may want to quickly identify and handle messages that contain time sensitive information or that require an immediate response.

The user can manually examine each message briefly to determine its priority, but this requires time and effort by the user. The user may rely on priority indicators provided by a message sender (such as an email marked "urgent" by the sender) but these indicators may not accurately reflect the priority of the message from the user's point of view. Message handling software may allow the user to set up fixed rules that look for certain keywords or addresses to identify high priority messages. However, this requires advance setup by the user and the rules are often inflexible and incomplete.

SUMMARY

A system, method, and computer program product dynamically prioritizes electronic messages. In one embodiment, an electronic message having one or more properties is received. These message properties can include the sender, recipients, subject line, full body text, thread ID, attachments, and other features of the message. Information describing past activity of a recipient user of the electronic message is accessed. A priority is determined for the electronic message, where the determination is based at least in part on a comparison of a property of the electronic message with the accessed information. The priority determination may include detecting the presence of a request in the electronic message, determining the social weight of the sender of the electronic message, determining the temporal urgency of the electronic message, or determining the relevance of the electronic message, for example. An indication of the priority of the message is presented to the recipient user.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
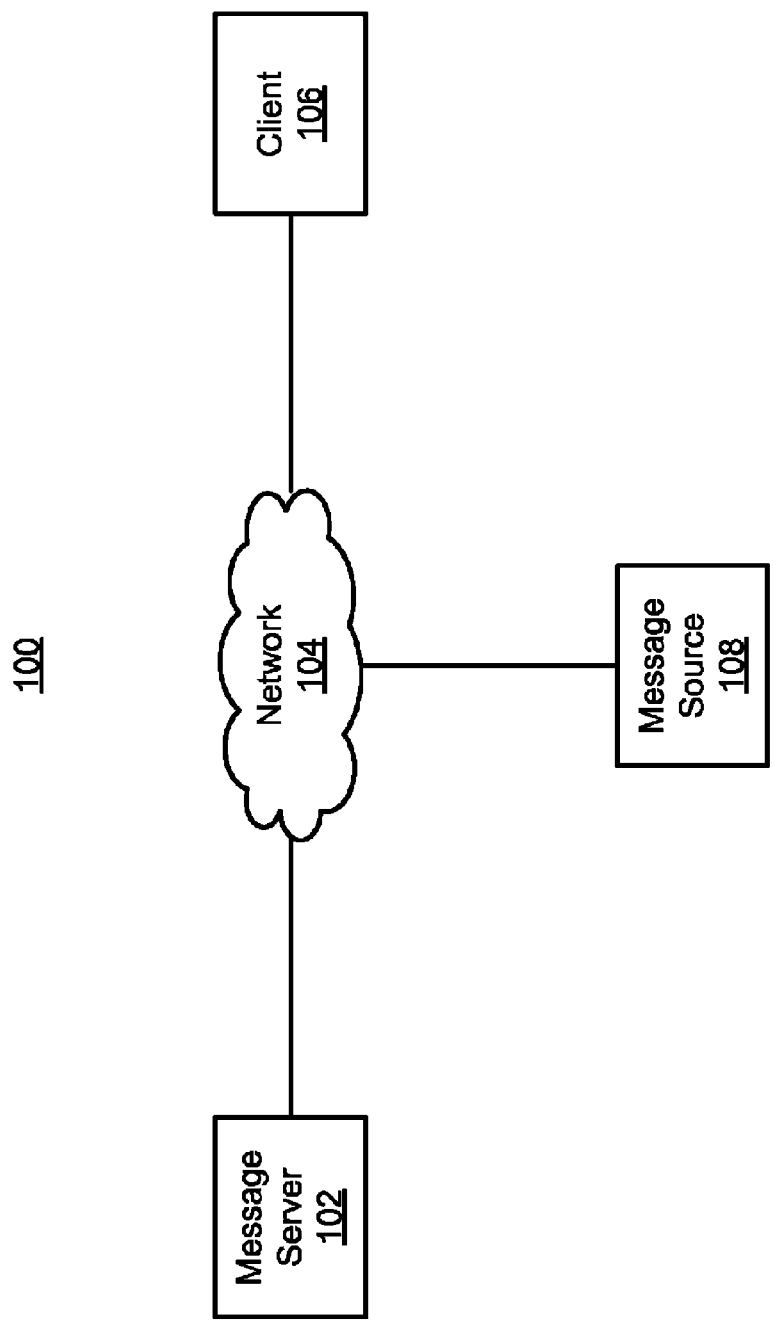
FIG. 1 is a high-level diagram illustrating an environment for prioritizing electronic messages, in one embodiment.

FIG. 1 is a high-level diagram illustrating an environment 100 for prioritizing electronic messages, in one embodiment. The environment 100 includes a message server 102, a message source 108, and a client 106 that are connected via a network 104. The network 104 is a communications network such as a local area network, a wide area network, a wireless network, an intranet, or the Internet. Although one client 106 and message source 108 are shown, there may be several on the network 104. Electronic messages from message sources 108 are sent across the network 104 and received and processed by the message server 102. The messages at the message server 102 are accessed by a user at a client 106 where the messages are presented to the user with priority indications.

The message source 108 may be a computing device capable of sending electronic messages, such as a workstation, laptop, cell phone, or other mobile device. The electronic messages may be emails, SMS messages, voicemails, or various other electronic documents. A sender at the message source 108 sends an electronic message that includes an address specifying a user at the client 106 as the desired recipient of the document (or one of the desired recipients). The message may include information identifying the sender (e.g., a sender address) and a priority indicator provided by the sender, such as an indicator of unusually high or low importance. In the description below, the term "user" refers to the recipient of the message at the client 106 and the term "sender" refers to the sender of the message at the message source 108.

Messages sent by the message source 108 are routed, via computers in the network 104 to the message server 102 where the messages are received, processed, and stored, in one embodiment. These messages are also referred to below as "incoming messages". The message server 102 determines factors related to each incoming message that are useful for determining the priority of the message. One prioritization factor is whether the message contains a request of the user. Another prioritization factor is the "social weight" of the sender that specifies the importance or level of connection of the sender to the user. The message server may also attach additional metadata to the message, such as detected person, location, or date/time entities. The message server 102 has access to information such as previous messages received by and sent by the user to determine prioritization factors. In one embodiment, the message server 102 attaches these factors as metadata to the incoming messages. The message server 102 may also perform other processing of messages to generate information for use by the client 106 to determine message priority.

The client 106 may be a device capable of communicating over network 104 and receiving and displaying messages to a user. Examples of a client 106 include a personal digital assistant (PDA), a mobile phone such as a smart phone, a laptop, a desktop computer, and a computer with limited external user interfaces (such as a television set-top box or in-store computer kiosk). In one embodiment, the client 106 is a mobile device that offers broad functionality. For example, the mobile device may send and receive phone calls, send and receive SMS messages and email, offer web access, provide GPS functionality, manage contact information, track calendar appointments, and manage and communicate other types of documents.

The client 106 receives incoming messages from the message server 102 and presents them to the user for review, in one embodiment. The client 106 may receive prioritization factors for the incoming messages from the message server 102 (e.g., as metadata attached to the incoming messages). The client 106 may also determine further prioritization factors for the incoming messages such as the relevance or temporal urgency of the incoming messages. These factors may be based on recent user behavior on the client 106 such as which documents the user has recently accessed. The client 106 combines the various prioritization factors to determine an overall priority for each incoming message. The incoming messages can then be displayed to the user along with the determined priorities to enable the user to choose which messages to spend time reading.

The client 106 and message server 102 can learn more about the user over time to better determine message priorities. A message's priority can be updated multiple times after the message has been received at the message server 102 or client 106. Priority updates can be performed periodically or each time the user views the message, for example. This allows for dynamic prioritization of messages. For example, the temporal urgency factor must be updated over time to reflect different messages becoming more urgent. In the embodiments described below, certain prioritization functionality is on the message server 102 while certain functionality is on the client 106. However, other distributions of functionality are possible. In one embodiment, the message server 102 and client 106 are the same computer, and this computer receives messages from the message source 108 and presents the messages to the user.

Figure 2:
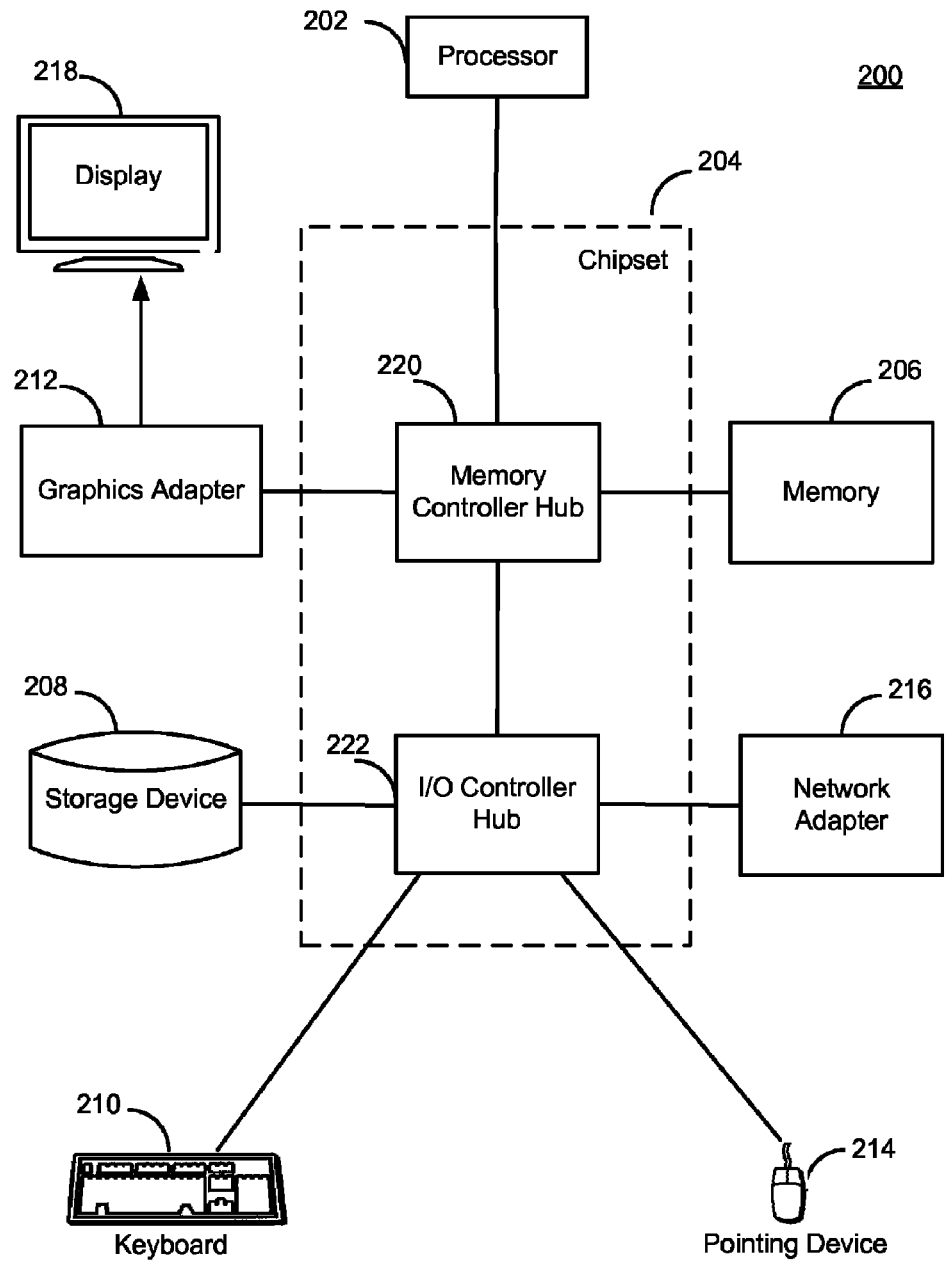
FIG. 2 is a high-level block diagram of a computer for acting as a message server and/or a client, in one embodiment.

FIG. 2 is a high-level block diagram of a computer 200 for acting as a message server 102 and/or a client 106, in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as an message server 102 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
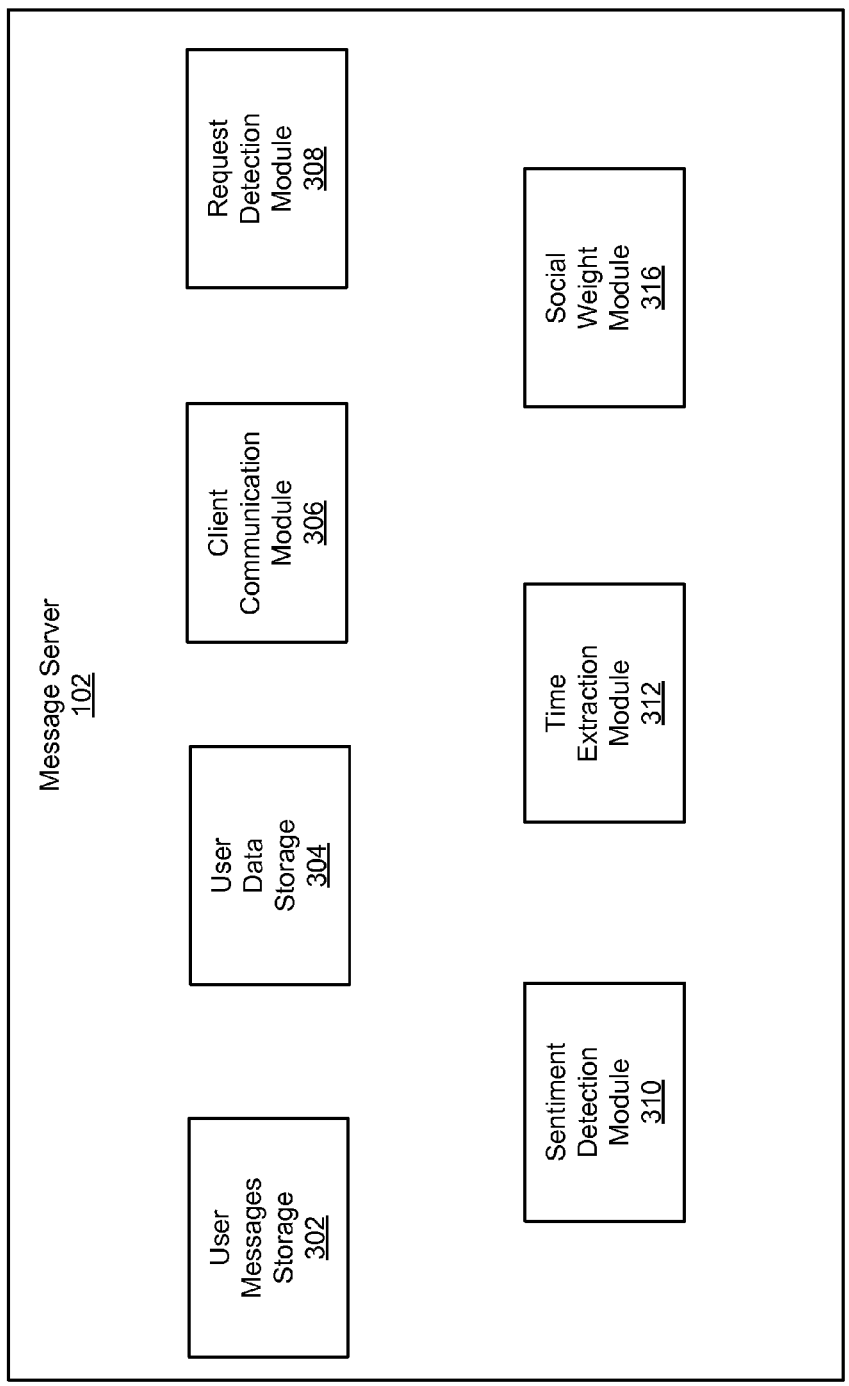
FIG. 3 is a block diagram illustrating the message server, in one embodiment.

FIG. 3 is a block diagram illustrating the message server 102, in one embodiment. The message server 102 receives incoming messages for the user from message sources 108 and provides the messages to the client 106. The message server 102 may perform processing on the messages and attach metadata to the messages to enable the client 106 to prioritize the messages. The message server 102 may also handle outgoing messages sent by the user at the client 106. The message server 102 may use information obtained from the user's incoming messages, outgoing messages, and other information provided by the client 106 regarding the user to process the messages and generate prioritization factors.

The client communication module 306 handles communication with the client 106. This communication includes sending incoming messages to the client 106 along with prioritization factors which may be sent as metadata attached to the messages. The prioritization factors may be received from various modules on the message server 102 such as the request detection module 308 or social weight module 316. The communication may also include receiving outgoing mail from the client 106. Both incoming and outgoing mail may be stored in the user messages store 302 for further analysis. The client communication module 306 may also receive data from the client 106 regarding user activities, such as the user's patterns of reading messages on the client. This received data may be stored in the user data storage 304.

The user messages store 302 may include incoming and outgoing messages associated with a user of the client 106. Messages may be kept in the user messages store for a period of time, such as one year. These messages may be stored for processing by the message server 102 to determine patterns associated with the user's messaging history (e.g., how many messages are received from a particular sender). The user data storage 304 may contain data associated with a user of the client 106 including data regarding the user's activity received from the client and including data determined by the message server 102 by processing messages in the user messages store 302.

The request detection module 308 detects the likely presence of requests within incoming messages. The presence of a request within a message is often an indicator that the message is of higher priority to the user than a message without a request, since the user may desire to respond to the message or take other action based on the request. A sentence indicating a request within a message may be, for example, "Please send me the package by overnight courier." or "What time is the flight arriving?". Various algorithms may be used to perform request detection. In one embodiment, the message is searched for various features (e.g., the word "please" or the presence of a question mark) to determine if it contains a request. The message may be analyzed as a whole or may be divided up into small chunks (e.g., sentences) for analysis. The history of the message sender can also be taken into account when performing request detection. For example, some senders may often end messages with the statement "please contact me if you have any questions," which often does not indicate a true request. This pattern can be detected in the sender's messages by analyzing the user messages storage 302, and the statement can be ignored for purposes of request detection.

In one embodiment, the request detection module 308 is provided with training data for performing request detection. This training data may comprise a set of messages sent between users, some of which contain requests. An example source of training data is the publicly available Enron Email Dataset which includes hundreds of thousands of emails sent between various high-level Enron employees during the years 2000 to 2001. Since the size of the messages in the training data may vary, the training data messages may be broken into chunks of 3 to 4 sentences each. A human can then review each chunk to determine whether it contains a request or not. The request detection module 308 can then be trained, using a machine learning algorithm, to automatically classify messages based on these reviewed chunks and the human determinations. In one embodiment, a naive Bayes classifier is generated from the training data. This classifier learns the features of emails containing requests from the training data and associates certain phrases with having particular probabilities of being a request.

Once trained, the request detection module 308 can examine incoming messages and determine whether the messages likely include a request. The request detection module 308 may produce a binary result indicating that a message likely contains or does not contain a request. In one embodiment, the request detection module 308 may produce a non-binary result (e.g., the percentage chance that the message contains a request). The request detection module 308 may also break the message into chunks and perform request detection on each chunk to estimate the number of requests and location of requests within the message. The request detection module 308 provides the result of the request detection to the client communication module 306 for inclusion in the metadata attached to the message, in one embodiment.

The sentiment detection module 310 determines or detects a sentiment that may be expressed in incoming messages. Possible sentiments include, for example, happiness, sadness, excitement, anger, urgency, and humor. Also, the degree of a particular sentiment or the degree any sentiment in general may be determined by the sentiment detection module 310. In one embodiment, sentiment detection may be performed using various heuristics, such as looking for certain words, phrases, types of capitalization, or punctuation (e.g., exclamation points). The detected sentiment may be provided to the client communication module 306 for attachment to the message metadata as a prioritization factor, in one embodiment. The sentiment may be useful in prioritizing the message. Certain sentiments may indicate priority or lack of priority. A high degree of sentiment in general may indicate a higher priority.

The social weight module 316 determines a social weight of the sender of an incoming message. The social weight of a sender is a value indicating the importance or closeness of the sender to the recipient and can be used as a factor in determining the priority of the message. A message from a sender with higher social weight may be given higher priority. Social weight is a property of the sender relative to the recipient, so one sender may have different social weights for different recipients.

The social weight module may include or make use of the social network module described in related application Ser. No. 12/512,752. The social network module builds a social network model implicit in a user's data, such as from contacts, messages (e.g., email), web pages, as well as other types of documents. The social network model is a description of the relationships between the entities that are found in the user's data. The social network module can determine the strength of relationships between the user and other entities (e.g., message senders). The relationship strength between the user and a particular sender can be based on the amount of messages received from the sender or sent to the sender, for example. It may also be based on a variety of other factors as described in application Ser. No. 12/512,752. The relationship strength with a sender as determined by the social network module may be used by the social weight module to determine the social weight of the sender. In one embodiment, the social weight of a sender is equal to the relationship strength.

Additional possible factors for determining the social weight of a sender are now described. One factor may be the read rate of the sender's messages by the recipient. The greater the percentage of the sender's messages that are read by the recipient may indicate a greater social weight of the sender. Another factor is the reply rate of the recipient to the sender. The more often the recipient replies to the sender's messages may indicate a greater social weight of the sender.

Related to the read and reply rate are the read and reply speed of the recipient. The amount of time that elapses from the time that the message is received by the recipient to the time that the recipient actually reads or replies to the message can be determined. The read and reply speed can be determined by comparing the time the message is received to the time the message is read or replied to and determining the elapsed time. Shorter times (e.g., times that are shorter than the recipient user's average elapsed time) may indicate a higher social weight of the sender.

The elapsed time can be adjusted to only account for working hours or for times that the recipient was logged in. For example, if a message was received at 2 AM and the recipient logged in at 9 AM and read the message at 10 AM, then the elapsed time can be considered only 1 hour. The elapsed time may cover only time since the user was notified of the message or otherwise made aware of the message. The elapsed time after being adjusted as described above is referred to as the "available elapsed time".

Another factor for determining the social weight of a sender may be the quantity and nature of message communications between the sender and user. The volume of messages (including email, IM, SMS, phone calls, etc.) sent (e.g., over a particular time in recent history) can be determined. The balance of communication (e.g. from sender to user versus from user to sender) can be also determined. Also, the messages can be examined to determine if they were sent specifically from the sender to the user (or user to sender) or if they were sent to multiple people that included the sender and user. Social weight may also be based on data about the size of messages or duration of phone calls, as well as the distribution of communications over time. For example, larger messages may indicate greater social weight, and a steady volume of communications over a long period of time may indicate greater social weight. Generally, the social weight of a sender may be based on past activity of the user relative to the sender, where this past activity includes the receipt of messages from the sender (and properties of those messages), the sending of messages to the sender (and properties of those messages), and the handling of messages (e.g., reply speed).

Various analyses can be performed on messages to identify the message sender, recipient, and any other parties for purposes of determining social weight. In one embodiment, these analyses can be performed by the entity extraction module as described in related application Ser. No. 12/512,752.

The data for determining social weight can be received from various sources. The user messages store 302 may contain incoming messages sent to the user and outgoing messages sent from the user. These messages may be analyzed to determine factors such as volume of communication, balance of communication, and reply rates, for example. The user data storage 304 may also contain data for determining social weight. It may include data on read times and reply times, for example. Read and reply times and other user activity may be observed on the client and then sent to the message server 102 where it is received by the client communication module 306 and stored in the user data storage 304. The user data storage 304 may also include data on phone calls (e.g., length and frequency of calls) with various senders. Data on phone calls may be provided by the client or by other sources, such as a phone system. The social weight of a sender may change dynamically, and the social weight can be recalculated when desired. In one embodiment, the social weight of a sender of a message is calculated when the message is sent to the client 106, and this calculated social weight is attached to the message as metadata. The client 106 may later request an update of the social weight from the message server 102 occasionally (e.g., each time the user reviews messages at the client).

The time extraction module 312 identifies and processes references to times in incoming messages. References to times in messages may be useful for determining the priority of a message because the times may indicate the urgency of a request or event. The time extraction module 312 can locate references to times in messages based on various rules. References to times can also be located by the entity extraction module further described in related application Ser. No. 12/512,752. The time extraction 312 module can convert relative times to absolute times so that the times can be more easily processed by the client 106 to determine urgency. For example, a sender may send a message on the evening of Dec. 17, 2009 containing the sentence "Please send me these documents by tomorrow afternoon". The time extraction module 312 can identify the relative time "tomorrow afternoon" and convert it to an absolute time of Dec. 18, 2009 at 12:00 PM to 5:00 PM based on the time the message was sent. Other examples of relative times include "next Tuesday" or "an hour from now". The time extraction module 312 can also locate absolute times mentioned in the message. These absolute times may not require further processing, but may be converted to a standard form. The time extraction module 312 can identify times by looking for certain words, punctuation, or patterns indicative of times. The extracted (and possibly converted) times can be attached to the incoming message as metadata. The locations of the extracted times within the message can also be included in the metadata.

Figure 4:
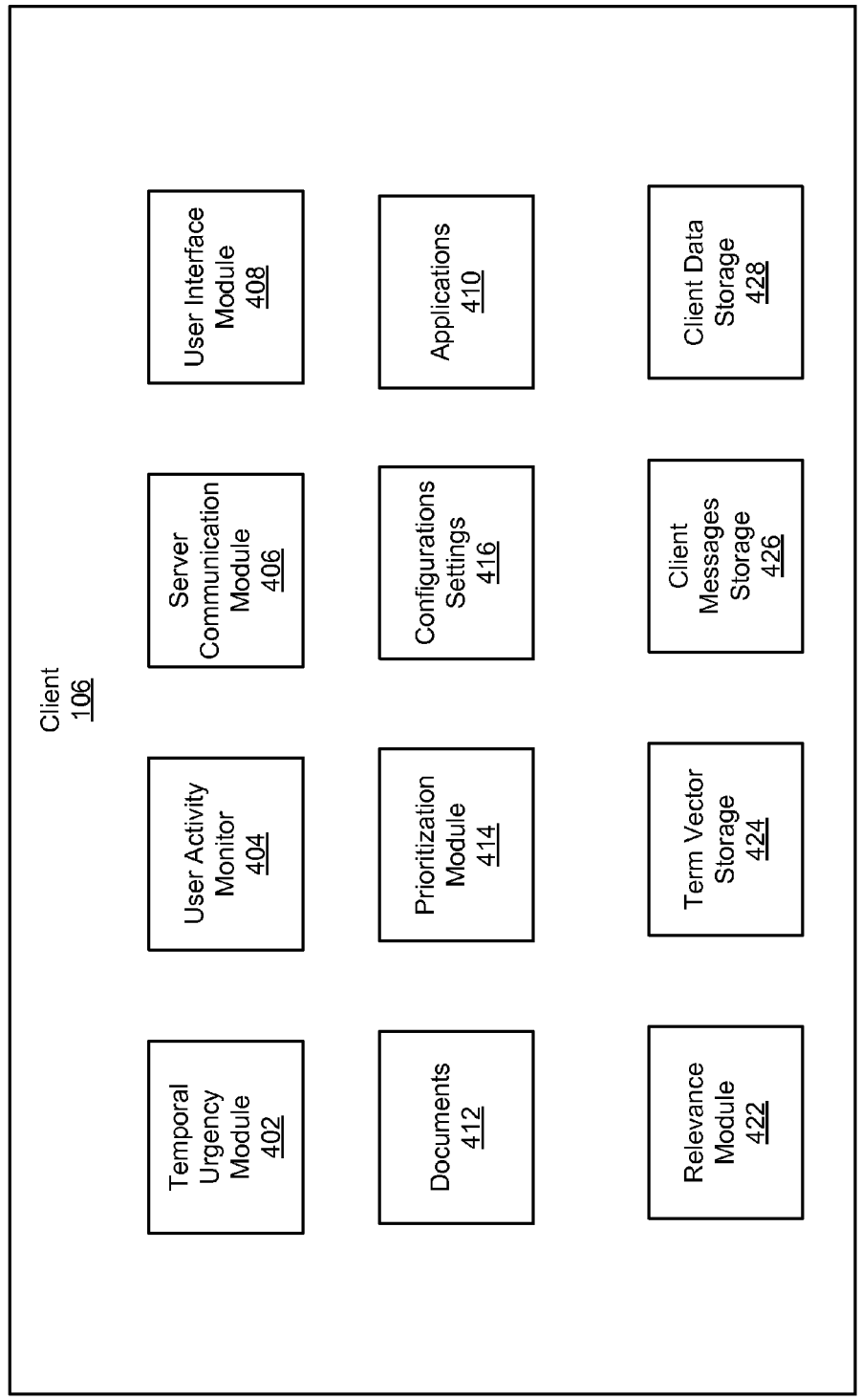
FIG. 4 is a block diagram illustrating the client, in one embodiment.

FIG. 4 is a block diagram illustrating the client 106, in one embodiment. As mentioned above, the client 106 receives messages from the message server 102. Priority data are determined for the messages and the messages are displayed to the user in a manner based, at least in part, on the priority data. Each message may be displayed along with a priority or the messages may be displayed in a priority sorted order to the user. Though some of the factors for prioritization are determined by the message server 102, some factors may be determined by the client 106 as described below. The user may also use the client 106 for other purposes such as sending messages, using various applications and utilities, and managing appointments.

The server communication module 406 handles communication with the message server 102. The server communication module 406 can receive incoming messages with metadata attached (e.g., indicating prioritization factors) and can send outgoing messages. It can also provide user data to the message server 102 such as data about user activity on the client.

The client message storage 426 can be used to store incoming messages and metadata received from the message server 102. The client data storage 428 can store data regarding user activity or other user-related data that may be obtained from other modules on the client 106. This data in the client data storage 428 may be sent to the message server via the server communication module 406. This data may include, for example read times and reply times of the user that are used by the social weight module 316 in the server as described above.

The user interface module 408 provides a user interface for the user to review incoming messages. The user interface displays priority indications for the incoming messages. The priority indications are determined by the prioritization module 414 as described below. The priority indications may be attached to the messages when displayed or may be attached to brief summaries of messages in a displayed list of messages (e.g., list of messages showing only the subject, date, and sender). The priority indication may comprise a color, an icon (e.g., an exclamation point) or other visual or audio identifier. The user interface may also sort incoming messages based on priority and may present higher priority messages to the user first. In one embodiment, the user can turn off priority indications. The user interface module 408 may also allow users to read messages, send messages, and reply to messages. By providing priority indicators or sorting messages based on priority, the user interface module allows the user to focus on higher priority messages before attending to other incoming messages. In one embodiment, the user interface may choose a small number of highest-priority messages and make those easily accessible to the user. For example, the user interface module 408 may display a "status bar" at all times, and one element on the status bar may provide immediate access to the top five or top ten prioritized messages, with a user interface element to allow the user to see the rest of the messages.

The user may use various applications 410 on the client 106 such as word processing applications, spreadsheet applications, and contact management applications. The use of these applications may involve the user accessing various documents 412 such as word processing or spreadsheet documents.

The user activity monitor 404 monitors the user's activity on the client 106. This monitored activity may be analyzed and used to determine which messages are of higher priority. The user activity monitor 404 may track which applications 410 have been recently used, which user interface elements or physical buttons have been used, and which documents 412 have been recently accessed. It may process the recently accessed documents to extract information from them that may indicate the current concerns or interests of the user.

The user activity monitor 404 may also monitor the user's activity in the user interface module 408. The user activity monitor 404 can monitor when the user reads and replies to individual messages and can generate read time and reply time statistics for the user with respect to different senders. As mentioned above, the read time and reply time may be adjusted to only account for available time by excluding periods of time when the user is busy and unable to read messages. The user activity monitor 404 may be able to determine this busy time by monitoring when the user is actively working in an application 410 or by monitoring when the user interface module 408 is opened and closed. The user activity monitor 404 can also monitor the amount of time that a user spends reading particular documents 412 or messages in the user interface module 408. The monitored activity, including summary statistics, can be stored in the client data storage 428.

The relevance module 422 determines what is currently or recently relevant to the user based on the user's activities. Relevant topics, also referred to as "top of mind" topics, are topics that the user is likely to be currently concerned with based on the user's recent activity. Once identified, these relevant topics can be identified in messages, and messages related to these topics can be given an increased priority.

In one embodiment, the relevance module 422 examines recently accessed documents 412 and messages that have been identified by the user activity monitor 404. The relevance module 422 may extract commonly occurring or unusual keywords or phrases from these documents and messages to summarize the current interests of the user. The relevance module may also attempt other methods of summarization such as looking at subject lines or emphasized text. The relevance module can then search for these keywords or phrases in incoming messages and determine a relevance score based on the presence of these keywords or phrases in the messages. A higher relevance score (e.g., more keywords found) may indicate that the message should be given a higher priority.

In one embodiment, a combined term vector, also referred to as the "top-of-mind" vector or model, is created that summarizes terms or phrases recently relevant to the user. This combined term vector is then compared to term vectors for incoming messages to determine their relevance. The computation and use of term vectors are further described below. In one embodiment, the term vectors for the messages are created by the relevance module 422 on the client 106. In another embodiment, the term vectors for the messages are created by the message server 102 when messages are received from the network 104 and are attached to the messages as metadata and sent to the client by the communication module 306. In this embodiment, the portion of the functionality of the relevance module 422 for computing message term vectors is located on the message server. The message term vectors are then compared to the top-of-mind vector by the client relevance module 422 to determine the relevance of each message. The term vector for each message that the user reads or responds to may also contribute to the top-of-mind vector. In another embodiment, the message term vectors are not communicated to the client. Instead, the message server compares the vectors for incoming messages to the top-of-mind vector and transmits only the results of the comparisons (e.g., as scores) to the client. In this embodiment, the message server contains most of the functionality of the relevance module 422 and maintains the top-of-mind vector, which is updated frequently with information from the client about user behavior. This requires less client storage as term vectors are only retained on the server in this embodiment.

The temporal urgency module 402 determines a degree of temporal urgency for an incoming message based on references to times in the message. References to times in the message may be useful for determining the priority of the message because the times may indicate the urgency of a request or event. The time extraction module 312, described above, on the message server 102, extracts references to times in incoming messages and converts relative time references to absolute time references. This information is attached to the messages as metadata, which is accessed by the temporal urgency module 402.

The temporal urgency module 402 can determine the urgency of these time references based on the current time when the user is reviewing the messages. Time references in the near future or near past may be assigned a higher urgency than time references in the distant future or past. For example, if an incoming message has a time reference of December 18 at 3:00 PM and the user is reviewing the message on December $12^{th}$, the message may be assigned a temporal urgency of 50 out of 100. If the user is reviewing the message on December $18^{th}$ at 12:00 PM, the message may be assigned a temporal urgency of 75 since the time reference is in the near future. If the user is reviewing the message on December $18^{th}$ at 3:15 PM, the message may be assigned a temporal urgency of 90 since the time reference has recently passed and the user may need to take action immediately. If the user is reviewing the message on December $23^{rd}$, the message may be assigned a temporal urgency of 25 since the time reference passed several days ago and action by the user is likely not urgent anymore.

If multiple time references are present in a message, the temporal urgency of the message may be based on the most urgent reference or on a combination of the references. The time references may be combined with other properties of the message to determine their urgency. For example, a time reference in a message likely having a request can be given greater urgency than other time references. A message having a time reference near a request can be given even greater urgency. The presence and location of a request within a message may be determined by the request detection module 308 and provided by the message server 102. The temporal urgency of a message can be recalculated at the time a user reviews the message, contributing to a dynamic priority of the message.

The prioritization module 414 determines a priority for each incoming message, in one embodiment. The priority module can combine the various factors determined by the other modules to determine an overall priority score for the message. This overall priority score may be binary (e.g., high priority or normal priority) or one of a set of discrete values (e.g., high, medium, or low priority) or one of a range of values (e.g., a score from 0 to 1, where 0 is the lowest priority, 1 is the highest priority, and 0.5 would be approximately average priority). The overall priority may be determined based on any combination of the following factors:

Detected request(s) by the request detection module 308

Social weight of sender determined by the social weight module 316

Sentiment determined by the sentiment detection module 310

Temporal urgency determined by the temporal urgency module 402

Relevance determined by the relevance module 422

Read or unread status of the message

Sender-set priority of the message

The read or unread status of the message indicates whether the message has already been read by the user. This status may be received from the user activity monitor 404 or user interface module 408. An unread status may indicate a higher priority than a read status. The sender-set priority indicates a priority set by the message sender, such as a high importance flag. The sender-set priority may contribute to the priority determined by the prioritization module. Other factors beyond the factors listed above may be used to determine message priority.

The prioritization module 414 may combine the above factors using various weights or conditional logic to determine a overall message priority. Each factor can be expressed as a score in a normalized range, such as from 0 to 1 where 1 indicates the factor most contributes to higher priority. For example, a moderately strong social weight of a sender may result in the social weight factor having a normalized score of 0.8. These factor scores may each be multiplied by a factor weight that specifies how important the factor is in determining overall priority to produce an overall priority score. For example, if social weight has a factor weight of 5 and temporal urgency has a factor weight of 1, then the social weight factor score contributes five times as much as the temporal urgency factor score to the overall priority score. In one embodiment, some or all of the following rules are applied:

All unread messages are prioritized higher than all read messages.

Messages from senders with high social weight are prioritized higher than messages from senders with lower social weight, even if they contain requests.

Messages from senders with low social weight that include requests are prioritized higher than messages from senders with low social weight that do not include requests Temporal urgency of messages is used as a tiebreaker between messages with the same social weight and request status.

For example, the following weights on various prioritization factors would produce a prioritization system that followed the above rules:

Read or unread status has a weight of 5
Social weight has a weight of 1
Request detection has a weight of 0.7
Temporal urgency has a weight of 0.1

The overall priority of messages, along with the factors contributing to message priority can be recomputed at any time allowing for dynamic assignment of priority. In one embodiment, priorities are recomputed each time the user activates the user interface module 408 to review messages, and the updated priorities are displayed to the user. For example, temporal urgency may change frequently as referred-to time points draw nearer in time, and relevance may change frequently as the user engages in different activities and views different documents.

In one embodiment, the user can configure the settings of the prioritization module 414. These settings may be stored in the configuration settings 416 that are accessed by the prioritization module 414 when computing message priorities. The user interface module 408 may allow the user to view or edit the current configuration settings. Possible configuration settings include an indication of which factors should be used or not used in determining priority. The configuration settings may also specify the weights to be assigned to the particular priorities. The configuration settings may also specify how often priorities should be recomputed.

Figure 5:
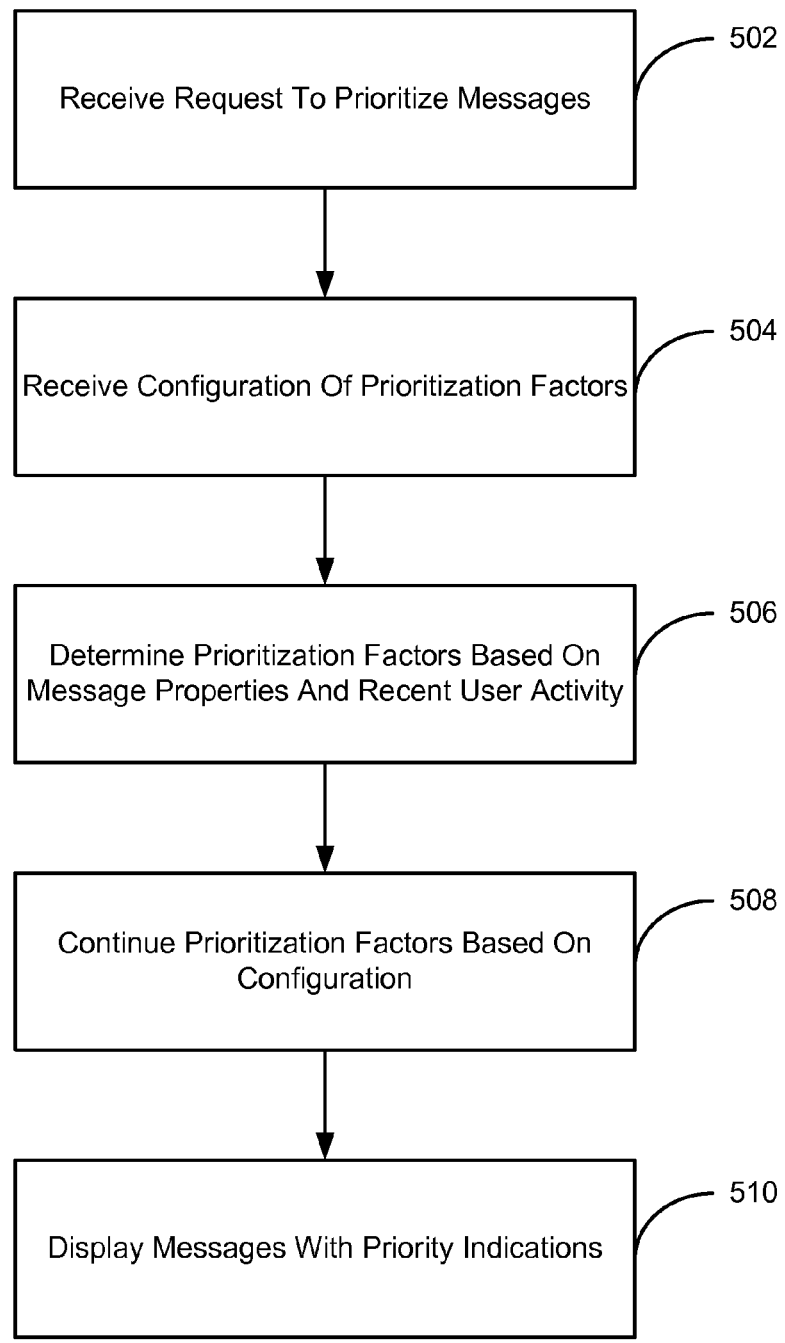
FIG. 5 is a flowchart illustrating a method for dynamically prioritizing messages, in one embodiment.

FIG. 5 is a flowchart illustrating a method for dynamically prioritizing messages, in one embodiment. A request is received 502 to prioritize messages. This request may be initiated by the user interface module 408 when the user indicates a desire to review recent messages. The request may also be initiated periodically to prioritize messages based on recent activity. A configuration of prioritization factors is received 504. The configuration specifies which factors should be considered for prioritizing incoming messages and how these factors should be combined to determine the prioritization. The configuration may be received from the configuration settings 416, and these configuration settings, including the weights of the factors, may be customized by the user.

The prioritization factors are determined based on the message properties and recent user activity. Prioritization factors include, for example, social weight of sender determined by the social weight module 316, temporal urgency determined by the temporal urgency module 402, the presence of requests determined by the request detection module 308, and relevancy determined by the relevance module 422. Message properties include, for example, the sender of the message, the presence of requests in the message, or the presence of times and places in the message. For example, the request detection module 308 analyzes the text of a message to determine if a request is present. The prioritization factors may also be determined based on recent user activity. For example, the relevance module 422 determines relevancy based on recent documents and messages accessed by the user, and the social weight module 316 of the sender determines social weight based on the user's recent response time to the sender's messages.

The prioritization factors are combined 508 based on the configuration described above. Certain factors may be given higher weights than others (e.g., read or unread status may be given a high weight) and certain logic may be used to combine the factors. The messages are displayed 510 with priority indications. This may involve displaying a priority icon or color with a brief listing of each message. The messages may also be sorted by priority.

The embodiments described herein enable messages to be dynamically prioritized (and re-prioritized) based on recent user activity or other state changes. A message may be prioritized with an initial priority when it is first received at the client, but may be given a different priority each time it is presented to the user depending on when the user views the message and the recent activity of the user. This allows for messages that are currently important, urgent, or relevant to the user to be prioritized higher. Some prioritization factors, such as the social weight of the sender, change infrequently or do not change at all and need not be recomputed every time messages are reprioritized; some of these factors may be computed by the message server 102. Other factors, such as temporal urgency and relevance change more often. In one embodiment, quickly changing factors are recomputed every time the user views messages while more slowly changing factors are recomputed less often. Factors computed by the message server may be recomputed and retransmitted to the client on a less frequent schedule.

Figure 6:
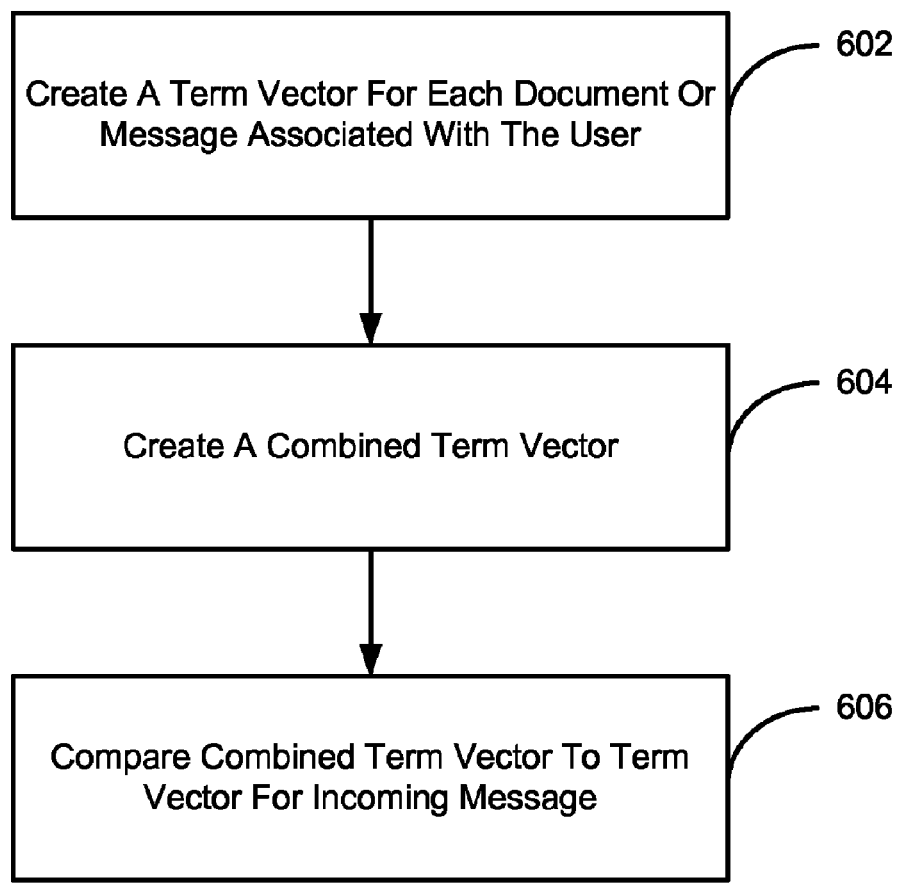
FIG. 6 is a flowchart illustrating a method for determining the relevancy of a message, in one embodiment.

FIG. 6 is a flowchart illustrating a method for determining the relevancy of a message, in one embodiment. The steps of this method may be performed by the relevance module 422 described above. A term vector is created 602 for each document or message associated with the user at the client. These include documents 412 and messages in the client message storage 426 that have been received, sent, accessed, or edited by the user. Each of the documents and messages are tokenized. This includes tokenizing the text (e.g., subject and body of messages, text of documents) into words. Phrases may be detected from the words based on part-of-speech analysis, selecting out noun phrases, and other heuristics. The words or phrases from the documents and messages are referred to below as "terms".

A term vector is created that includes a list of the terms in the document with associated weights. The weights are determined based on the frequency of terms in the particular document. These weights are also inversely scaled based on the frequency of the terms in all documents. This is also referred to as term frequency-inverse document frequency (tf-idf) weighting. This enables a term to be weighted higher in a document if it appears with a greater frequency in the document than it generally does in other documents. In other words, terms that "define" a particular document or make the document "stand out" from other documents are weighted higher. As a result of step 602, a term vector comprising terms and weights for each term is created for each document or message. These term vectors are also referred to as message term vectors and may be stored in the term vector storage 424. As mentioned above, this term vector storage 424 may be on the message server instead of the client.

In step 604, the individual term vectors for each document or message are summed together to produce a combined term vector. The weights of common terms from different vectors are summed together. In one embodiment, the vectors are summed with a decaying weight applied to each vector. The weights of a term vector can be multiplied by a scaling factor between zero and one for every unit of time that passes since the document or message corresponding to the term vector has been accessed or edited. For example, a decay factor for a particular document may be 0.9 per day. If the document has not been accessed for a day, the weights in the term vector for the document can be multiplied by 0.9. If it has been two days, the weights can be multiplied by $(0.9)^2=0.81$. If it has been three days, the weights can be multiplied by $(0.9)^3=0.729$. The decay factor can also be computed per hour rather than per day, for finer control over the decay rate. After a term vector is older than a certain threshold time, it can be excluded from the combined term vector. Since very old term vectors will likely not contribute significantly to the combined term vector, they can be excluded to make the computation of the combined term vector more efficient. By decaying the weights of individual term vectors before summing them to form the combined term vector, documents or messages that the user has accessed more recently are weighted more heavily since they better reflect the user's current interests.

The combined term vector is also referred to as a top-of-mind vector or model. When the decay factor is fast (i.e., closer to 0), the model incorporates only very recent activity and therefore describes the current interests of the user. When the decay factor is slower, the model incorporates more activity from recent days or even weeks and describes the interests of the user during that time span. When there is no decay (i.e., a decay factor of 1), the model incorporates all activity equally and summarizes all past and current interests of the user. In step 606, the combined term vector is compared to the term vector for an incoming message to determine the message's relevance. The message's term vector may be available from step 602 or it can be computed in step 606. The combined term vector can be compared to the incoming message term vector by computing the cosine of the angle between the vectors. This gives a measure of the similarity of the two vectors. This measure of similarity can be provided by the relevance module 422 as a factor for prioritizing the message.

In another embodiment, the relevance priority factor may be determined based on rules, either automatic or user defined. For example, new messages on the same thread as recently important messages or messages closely related to a document the user is currently editing may be given higher priority. In another embodiment, the user may deliberately specify a set of messages, mail threads, or documents as being of current interest, and incoming messages related to those objects can be given higher priority.

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method of dynamically prioritizing electronic messages, comprising:
   receiving an electronic message having one or more terms;
   forming an incoming term vector for the incoming electronic message, the incoming term vector including terms from the electronic message and associated weights;
   forming a combined term vector for a recipient user of the incoming electronic message, the combined term vector formed of individual term vectors for electronic messages previously received by the recipient user of the incoming electronic message, the weights of the individual term vectors decayed responsive to elapsed times since the previously received electronic messages were last accessed;
   determining a relevance of the incoming electronic message based on a comparison of the incoming term vector with the combined term vector;
   determining a priority of the electronic message based on the determined relevance; and
   presenting an indication of the priority of the electronic message to the recipient user.

2. The method of claim 1, wherein determining a priority of the electronic message comprises:
   detecting the presence of a request in the electronic message; and
   increasing the priority of the electronic message responsive to detecting the presence of the request.

3. The method of claim 1, wherein determining a priority of the electronic message comprises:
   determining a social weight of a sender of the electronic message, wherein the social weight of a sender is a measure of the closeness or importance of the sender to the recipient user.

4. The method of claim 3, wherein determining a social weight of a sender of the electronic message comprises:
   determining a reply rate of the recipient user to the sender, the reply rate indicating the proportion of messages from the sender to which the recipient user has replied.

5. The method of claim 3, wherein determining a social weight of a sender of the electronic message comprises:
   determining a read time of the recipient user for messages from the sender, the read time indicating an average time elapsed between the recipient user receiving a message from the sender and the recipient user reading the message.

6. The method of claim 5, wherein determining a read time of the recipient user for messages from the sender comprises:
   determining times that the user is unavailable to read messages based on a calendar of the user or based on activity of the user; and
   excluding unavailable time from the read time.

7. The method of claim 1, wherein determining a priority of the electronic message comprises:
   determining a type or degree of sentiment expressed in the electronic message.

8. The method of claim 1, wherein determining a priority of the electronic message comprises:
   locating a time reference in the electronic message; and
   determining a temporal urgency of the electronic message, the temporal urgency based on a comparison of the time reference in the electronic message with a current time.

9. The method of claim 8, wherein determining a temporal urgency of the electronic message comprises:
   converting the time reference in the electronic message from a relative time to an absolute time, a relative time being a time expressed relative to a time that the message was sent.

10. The method of claim 1, further comprising:
    generating information describing activities or interests of the recipient user of the electronic message at a plurality of different times;
    determining a plurality of different priorities of the electronic message, the determining based at least in part on a comparison of a property of the electronic message with accessed information, each of the plurality of different priorities corresponding to information describing activities or interests of the recipient user at a different time; and
    presenting indications of each of the plurality of different priorities of the electronic message to the recipient user at different times.

11. The method of claim 1, wherein forming the combined term vector comprises:
    decaying the weights of the individual term vectors responsive to elapsed times since the messages corresponding to the individual term vectors were last accessed; and
    summing decayed weights of common terms of the individual term vectors to form the combined term vector.

12. The method of claim 1, further comprising:
    determining an elapsed time since a message corresponding to an individual term vector was last accessed; and
    responsive to a comparison of the elapsed time since the message was accessed with a threshold, excluding the individual term vector from the combined term vector.

13. A non-transitory computer-readable storage medium having executable computer program instructions recorded thereon for dynamically prioritizing electronic messages, the computer program instructions comprising instructions for:
    receiving an electronic message having one or more terms;
    forming an incoming term vector for the incoming electronic message, the incoming term vector including terms from the electronic message and associated weights;
    forming a combined term vector for a recipient user of the incoming electronic message, the combined term vector formed of individual term vectors for electronic messages previously received by the recipient user of the incoming electronic message, the weights of the individual term vectors decayed responsive to elapsed times since the previously received electronic messages were last accessed;
    determining a relevance of the incoming electronic message based on a comparison of the incoming term vector with the combined term vector;

determining a priority of the electronic message based on the determined relevance; and presenting an indication of the priority of the electronic message to the recipient user.

14. The computer-readable storage medium of claim 13, wherein determining a priority of the electronic message comprises:

detecting the presence of a request in the electronic message; and increasing the priority of the electronic message responsive to detecting the presence of the request.

15. The computer-readable storage medium of claim 13, wherein determining a priority of the electronic message comprises:

determining a social weight of a sender of the electronic message, wherein the social weight of a sender is a measure of the closeness or importance of the sender to the recipient user.

16. The computer-readable storage medium of claim 13, wherein determining a priority of the electronic message comprises:

locating a time reference in the electronic message; and determining a temporal urgency of the electronic message, the temporal urgency based on a comparison of the time reference in the electronic message with a current time.

17. A computer system for dynamically prioritizing electronic messages, the system comprising:

a non-transitory computer-readable storage medium storing executable computer program modules for:

receiving an electronic message having one or more terms;

forming an incoming term vector for the incoming electronic message, the incoming term vector including terms from the electronic message and associated weights;

forming a combined term vector for a recipient user of the incoming electronic message, the combined term vector formed of individual term vectors for electronic messages previously received by the recipient user of the incoming electronic message, the weights of the individual term vectors decayed responsive to elapsed times since the previously received electronic messages were last accessed;

determining a relevance of the incoming electronic message based on a comparison of the incoming term vector with the combined term vector;

determining a priority of the electronic message based on the determined relevance; and presenting an indication of the priority of the electronic message to the recipient user; and a processor for executing the computer program modules.

18. The computer system of claim 17, wherein determining a priority of the electronic message comprises:

detecting the presence of a request in the electronic message; and increasing the priority of the electronic message responsive to detecting the presence of the request.

19. The computer system of claim 17, wherein determining a priority of the electronic message comprises:

determining a social weight of a sender of the electronic message, wherein the social weight of a sender is a measure of the closeness or importance of the sender to the recipient user.

20. The computer system of claim 17, wherein determining a priority of the electronic message comprises:

locating a time reference in the electronic message; and determining a temporal urgency of the electronic message, the temporal urgency based on a comparison of the time reference in the electronic message with a current time.

* * * * *